L. F. BAASH.
TWO PRONG COMPOUND FISHING TOOL.
APPLICATION FILED JAN. 6, 1919.
1,314,484.
Patented Aug. 26, 1919.
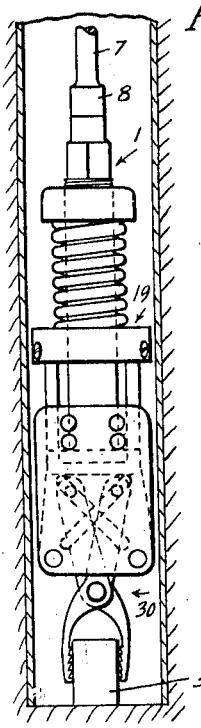
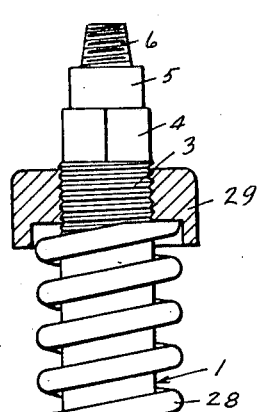
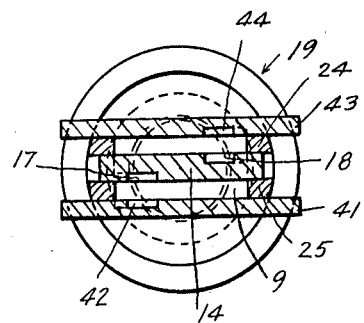
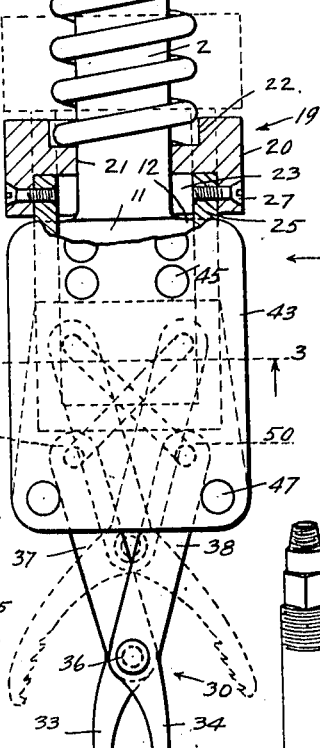
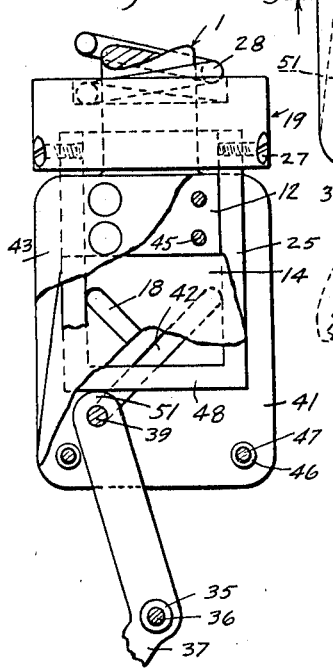
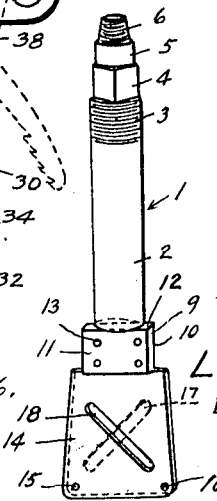
INVENTOR.
Lawrence F. Baash.
BY Hazard & Miller
ATTORNEYS

UNITED STATES PATENT OFFICE.

LAWRENCE F. BAASH, OF WHITTIER, CALIFORNIA.

TWO-PRONG COMPOUND FISHING-TOOL.

1,314,484.   Specification of Letters Patent.   Patented Aug. 26, 1919.

Application filed January 6, 1919. Serial No. 269,886.

*To all whom it may concern:*

Be it known that I, LAWRENCE F. BAASH, a citizen of the United States, residing at Whittier, in the county of Los Angeles and State of California, have invented new and useful Improvements in Two-Prong Compound Fishing-Tools, of which the following is a specification.

My object is to make a two prong compound fishing tool, and my invention consists of the novel features herein shown, described and claimed.

Figure 1 shows a side elevation of a two prong compound fishing tool embodying the principles of my invention in operation in the bottom of a deep well, the well being shown in section and the upper part of the well and rig being broken away.

Fig. 2 is an enlarged side elevation on the same plane as Fig. 1, and showing the fishing tool out of the well, parts being shown in section and the operation being shown in dotted lines.

Fig. 3 is a horizontal cross section on the line 3—3 of Fig. 2 and looking upwardly as indicated by the arrows.

Fig. 4 is a fragmentary detail view on the same plane as Fig. 2.

Fig. 5 is a fragmentary edge view looking in the direction indicated by the arrow 5 in Fig. 2, parts being shown in section.

Fig. 6 is a perspective of the main stem.

The details of the main stem 1 are as follows:

The shank 2 is straight and circular like a shaft. A screw thread 3 is formed upon the upper end of the shank 2, and above the screw thread 3 the shank is reduced in size and squared to form the wrench seat 4, and above the wrench seat 4 the shank is still further reduced to form the extension 5 and the attaching nipple 6. The operating stem 7 has a socket 8 to screw upon the attaching nipple 6. The head 9 extends downwardly from the lower end of the shank 2 and has flat faces 10 and 11. The head 9 is thinner one way, that is between the faces 10 and 11, than the shank 2, and is wider the other way than the shank 2, so as to form the shoulders 12. Perforations 13 are formed through the head 9 and connecting the faces 10 and 11. The guide plate 14 extends downwardly from the head 9 half way between the faces 10 and 11, said guide plate being considerably thinner than the head 9 between the faces 10 and 11, and considerably wider than the head 9 the other way. Perforations 15 and 16 are formed through the lower corners of the central guide plate 14, and a guide groove 17 is formed on one side of the guide plate at an angle of about 45° relative to the vertical axis, and a similar guide groove 18 is formed on the other side in a plane at right angles to the groove 17, the planes of the grooves 17 and 18 crossing each other at their centers.

The details of the sliding frame 19 are as follows:

An annular ring 20 has a central opening 21, and the ring is inserted downwardly upon the shank 2, the opening 21 fitting the periphery of the shank, so that the ring will slide up and down. A spring seat 22 is formed in the upper face of the ring around the shank 2. An annular recess 23 is formed from the lower face of the ring 20 around the shank 2. Presser bars 24 and 25 are placed against the faces 10 and 11, said presser bars being U-shaped in elevation, and the ends of the bars are inserted upwardly into the recess 23 and secured rigidly in place by cap screws 26 and 27 inserted through the ring 20, and tapped into the presser bars. A spring 28 is inserted downwardly around the shank 2 into the spring seat 22, and a spring seat 29 is screwed upon the threads 3 against the spring 28, the tension of the spring 28 being exerted to hold the presser bars 24 and 25 downwardly.

The details of the fishing jaws 30 are as follows:

The facing gripping faces 31 and 32 are formed upon the lower ends and inner faces of arms 33 and 34, and the upper ends of the arms 33 and 34 are offset outwardly. A spacing collar 35 is placed between the offset ends, and a rivet or bolt 36 is inserted through the parts 33, 34 and 35 to pivotally connect the jaws together. The levers 37 and 38 are formed integral with the arms 33 and 34 and extend upwardly. The lever 37 is formed integral with the arm 33, and the lever 38 is formed integral with the arm 34, and the parts are arranged like a pair of shears, except that they do not cross. The gripping faces 31 and 32 swing together when the levers 37 and 38 swing apart, and in order to swing the gripping faces 31 and 32 wide apart it is necessary for the levers 37 and 38 to swing toward each other and pass by each other. Pins 39 and 40 are fixed through the upper ends of the levers 37 and 38 and extend both ways from the side faces of the levers, the inner end of the pin 39 fitting the groove 17, and the inner end of the pin 40 fitting in the groove 18. The outer guide plate 41 has a groove 42 upon its inner face matching the groove 17, so that the outer end of the pin 39 fits in the groove 42, and the second outer guide plate 43 has a groove 44 upon its inner face matching the groove 18, so that the outer end of the pin 40 fits in the groove 44. The plates 41 and 43 are placed against the faces 10 and 11 of the head 9, and bolts or rivets 45 are inserted through the plates 41 and 43 and through the perforations 13 to hold the outer plates 41 and 43 rigid with the central guide plate 14. Spacing collars 46 are placed between the lower corners of the plates 41 and 43, and the lower corners of the plate 14, and bolts or rivets 47 are inserted through the plates 41 and 43, through the spacing collars 46 and through the perforations 15 and 16. The horizontal central portions 48 and 49 of the presser bars 25 and 24 bear against the rounded upper ends 50 and 51 of the levers 38 and 37, so that the tension of the spring 28 forces the fishing jaws 30 downwardly to swing the gripping faces 31 and 32 toward each other to grip the lost tool 52, as shown in Fig. 1, and to force the fishing jaws 30 downwardly to their closed positions, as shown in Fig. 2, when there is nothing between the jaws.

In the practical operation, the operating stem 7 is of considerable length, and of considerable weight, and when the fishing tool is lowered into a deep well and engages the lost tool 52 the points of the jaws 30 will engage the top of the tool and the weight of the stem and fishing tool will overcome the tension of the spring 28 and cause the pins 39 and 40 to travel upwardly in their grooves, thereby moving the levers 37 and 38 toward and past each other, thereby opening the jaws to their full extent, as shown in dotted lines in Fig. 2. Then as the operating stem 7 is elevated the jaws will snap together or toward each other and grip anything that may be between the faces 31 and 32.

Various changes may be made without departing from the spirit of my invention as claimed.

I claim:

1. A two prong compound fishing tool comprising, a main stem including a shank, a head, a central guide plate having oppositely inclined grooves in its opposite faces and outer guide plates secured to the head and having grooves in their inner faces matching the first grooves; a sliding frame including a ring mounted upon the shank and presser bars extending downwardly from the ring between the guide plates and fishing jaws including gripping faces pivotally connected, levers extending upwardly between the guide plates and engaging the presser bars and having pins operating in the grooves; a spring upon the shank against the sliding frame; and a spring seat upon the shank against the spring.

2. In a two prong compound fishing tool, a main stem; a frame slidingly mounted on the stem; oppositely inclined guide means carried by the stem; fishing jaws engaging the guide means; presser means engaging the fishing jaws; and a spring for operating the presser means.

3. In a fishing tool, three guide plates rigidly mounted; presser bars slidingly mounted between the guide plates; fishing jaws having levers slidingly mounted between the guide plates against the presser bars, there being oppositely inclined grooves in the guide plates; and pins in the fishing jaw levers operating in the grooves; so that when the fishing jaw levers go up they will move toward and past each other and open the jaws.

In testimony whereof I have signed my name to this specification.

L. F. BAASH.

Copies of this patent may be obtained for five cents each, by addressing the "Commissioner of Patents, Washington, D. C."